United States Patent
Ono et al.

(10) Patent No.: US 10,118,212 B2
(45) Date of Patent: Nov. 6, 2018

(54) METHOD FOR FORMING BLANKED PIECE AND MANUFACTURING METHOD OF LAMINATED BODY AND LAMINATED IRON CORE USING BLANKED PIECE FORMED BY METHOD FOR FORMING BLANKED PIECE

(71) Applicant: MITSUI HIGH-TEC, INC., Kitayushu-shi, Fukuoka (JP)

(72) Inventors: Shinichiro Ono, Fukuoka (JP); Masahiro Izumi, Fukuoka (JP); Shigetoshi Yamato, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 259 days.

(21) Appl. No.: 15/058,469

(22) Filed: Mar. 2, 2016

(65) Prior Publication Data
US 2016/0256912 A1 Sep. 8, 2016

(30) Foreign Application Priority Data
Mar. 6, 2015 (JP) .................................. 2015-044415

(51) Int. Cl.
*B21D 28/26* (2006.01)
*H01F 41/02* (2006.01)
(Continued)

(52) U.S. Cl.
CPC ......... *B21D 28/26* (2013.01); *H01F 41/0233* (2013.01); *H02K 15/022* (2013.01); *H02K 1/187* (2013.01); *H02K 15/095* (2013.01)

(58) Field of Classification Search
CPC .... B21D 28/26; H01F 41/0233; H02K 1/187; H02K 15/022; H02K 15/095; H02K 15/10;
(Continued)

(56) References Cited

U.S. PATENT DOCUMENTS 8,677,608 B2 *   3/2014  Akita ..................... H02K 1/148
                                                                   29/604
2013/0293060 A1  11/2013 Hasuo et al.

FOREIGN PATENT DOCUMENTS

CN          102132366           7/2011
CN          104065213           9/2014
(Continued)

OTHER PUBLICATIONS

Machine translation of JP4886375B2 is attached.*
(Continued)

*Primary Examiner* — Peter DungBa Vo
*Assistant Examiner* — John S Lowe
(74) *Attorney, Agent, or Firm* — Greenblum & Bernstein, P.L.C.

(57) ABSTRACT

A method for forming a blanked piece from a material, where the blanked piece includes a production area having a through hole and at least one caulking and connection area protruding inside the through hole. The method includes forming a blanking hole in the material in a prescribed outline, placing a guide member in the through hole, where the guide member has an abutting part contacting a protrusion of the material formed along the outline of the blanking hole. The method further includes cutting and separating the material to blank or stamp out downward the caulking and connection area, pushing back the caulking and connection area, and temporarily connecting the caulking and connection area to the material; and blanking or stamping an outer configuration of the product area from the material to which the caulking and connection area is temporarily connected.

7 Claims, 12 Drawing Sheets

(51) Int. Cl.
*H02K 15/02* (2006.01)
*H02K 1/18* (2006.01)
*H02K 15/09* (2006.01)
*H02K 15/095* (2006.01)

(58) Field of Classification Search
CPC ........... Y10T 29/49799; Y10T 29/4981; Y10T 29/49915; Y10T 29/49922
See application file for complete search history.

(56) References Cited

FOREIGN PATENT DOCUMENTS

| | | |
|---|---|---|
| JP | 2004-357349 | 12/2004 |
| JP | 2007-336608 | 12/2007 |
| JP | 4886375 B2 * | 2/2012 |
| JP | 2012-170222 | 9/2012 |
| JP | 5357187 | 9/2013 |

OTHER PUBLICATIONS

Original JP4886375B2 is attached.*
Office Action issued in China Counterpart Patent Appl. No. 201610127496.8, dated Jan. 3, 2018.

* cited by examiner

METHOD FOR FORMING BLANKED PIECE AND MANUFACTURING METHOD OF LAMINATED BODY AND LAMINATED IRON CORE USING BLANKED PIECE FORMED BY METHOD FOR FORMING BLANKED PIECE

CROSS REFERENCE TO RELATED APPLICATION(S)

This application is based upon and claims the benefit of priority of Japanese Patent Application No. 2015-44415 filed on Mar. 6, 2015, the contents of which are incorporated herein by reference in its entirety.

BACKGROUND OF THE INVENTION

1. Field of the Invention

The present invention relates to a method for forming a blanked piece high in its degree of freedom of design and excellent in its accuracy of a configuration and a manufacturing method of a laminated body and a laminated iron core using the blanked piece formed by the above-described method.

2. Description of the Related Art

A motor is usually used as a driving source of a refrigerator, an air conditioner, a hard disk drive, a power tool or the like. In recent years, the motor is also used as a driving source of a hybrid car. A laminated iron core which forms a rotor and a stator respectively as main components of the motor is formed in such a way that a prescribed number of iron core pieces manufactured by blanking or stamping out a thin electromagnetic steel plate to a prescribed configuration are laminated and the laminated iron core pieces are fastened and connected together. Then, a winding is applied to the laminated iron core for the stator, a shaft is attached to the laminated iron core for the rotor and both the laminated iron cores are accommodated in a casing, so that the motor is completed. Here, as a unit for fastening and connecting together the iron core pieces adjacent in a vertical direction in the laminated iron core pieces, a caulking or welding method is used from the viewpoint of a cost performance and a working efficiency.

Figure 7:
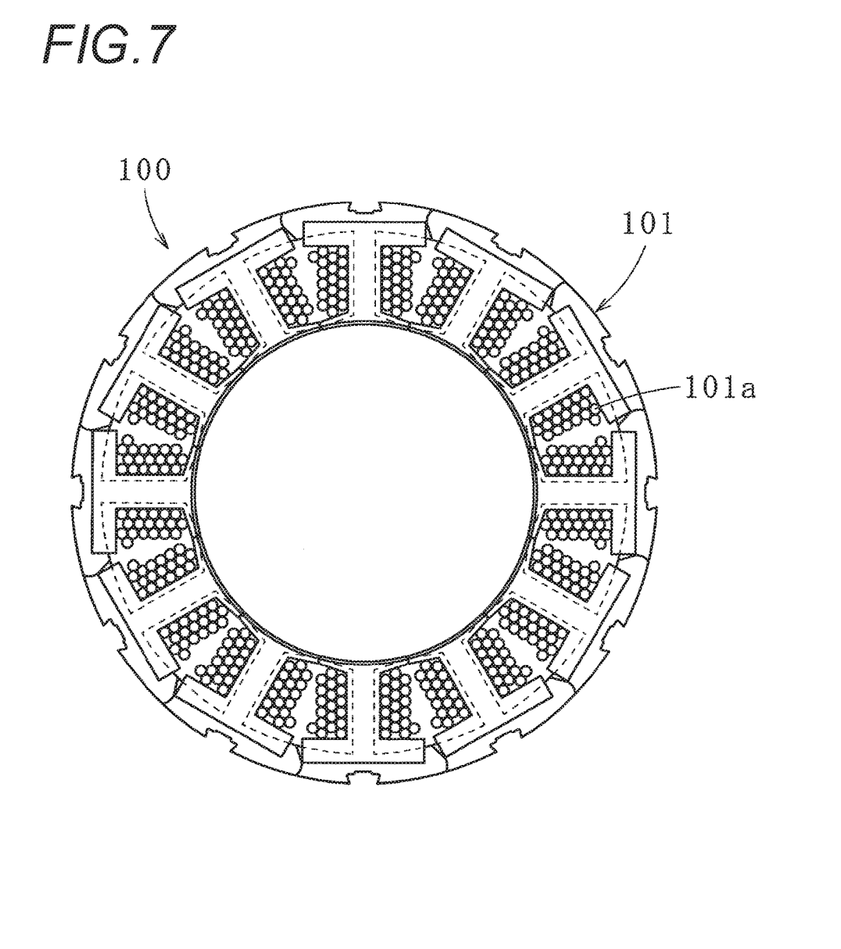
FIG. 7 is a plan and sectional view of a split type stator according to a usual example.

On the other hand, when a high torque and a low iron loss are preferentially considered in a motor property, a method for fastening and connecting together the iron core pieces by using a resin material is used in place of the caulking or welding method. For instance, Japanese Patent No. 5357187 as Patent Literature 1 discloses that in a production of a split type stator 100 shown in FIG. 7, a unit laminated iron core 101 which forms the split type stator 100 is manufactured by laminating, and fastening and connecting together iron core pieces 102 shown in FIG. 8. Here, the iron core piece 102 includes a product piece part 103 forming the unit laminated iron core 101 and a production jig piece part 104 fitted and fixed to the product piece part 103 by a push back. A winding 101a is shown in FIG. 7. Further, the push back refers to a working method that a blanking or stamping work in a half blanked state is carried out in which a movement of a blanking or stamping punch is stopped halfway, or a blanking or stamping work in a completely blanked state is carried out in which the blanking or stamping punch is moved by the thickness of an electromagnetic steel plate to substantially separate a blanked or stamped part from the electromagnetic steel plate, and then, the blanked or stamped part is pushed back to a blanked or stamped hole formed in the electromagnetic steel plate.

Figure 8:
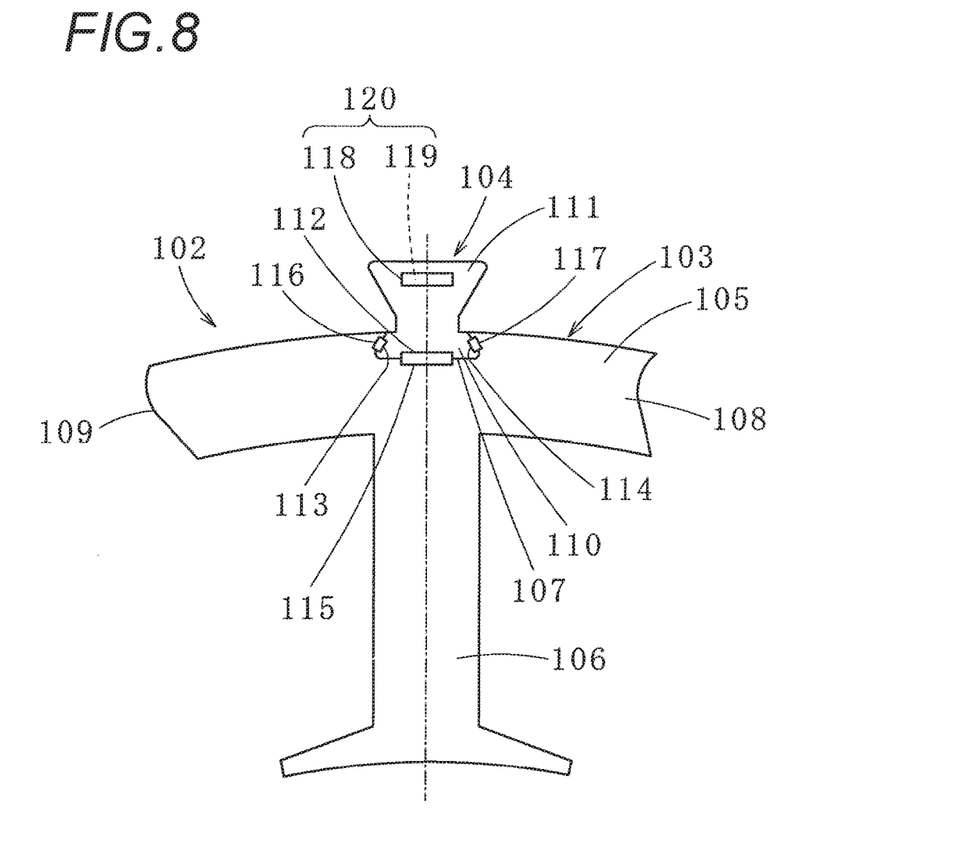
FIG. 8 is an explanatory view of an iron core piece used for forming the split type stator.

The product piece part 103 of the iron core piece 102 includes a sector shaped back yoke piece part 105 and a teeth piece part 106 protruding inside in a radial direction from a central part of an inner side of the back yoke piece part 105. In a central part of an outer side of the back yoke piece part 105 (a central part opposite to the teeth piece part 106), a fitting recessed part 107 is provided to which the production jig piece part 104 is fitted and fixed. In both ends of the back yoke piece part 105, an engagement recessed part 108 and an engagement protrusion 109 are respectively provided with which the adjacent product piece parts 103 are engaged.

Further, the production jig piece part 104 of the iron core piece 102 includes a fitting protrusion 110 fitted and fixed to the fitting recessed part 107 of the back yoke piece part 105 and a gripping protrusion 111 provided to protrude on the fitting protrusion 110. In order to reduce a contact area of the fitting recessed part 107 of the back yoke piece part 105 and the fitting part, in an end part of the fitting protrusion 110, a disengaging recessed part 112 is provided. At both sides of the fitting protrusion 110, disengaging recessed parts 113 and 114 are provided. Inside the fitting recessed part 107 of the back yoke piece part 105, disengaging recessed parts 115, 116 and 117 are respectively provided so as to be opposed to the disengaging recessed parts 112, 113 and 114 of the fitting protrusion 110 fitted and fixed thereto. Further, in a central part of the gripping protrusion 111 of the production jig piece part 104, a caulking and connection part 120 is formed with a front surface side as a fixing recessed part 118 and a back surface side as a fixing protrusion 119 which binds and connects together the production jig piece parts 104 adjacent in a vertical direction when the iron core pieces 102 are laminated in the vertical direction.

Figure 9:
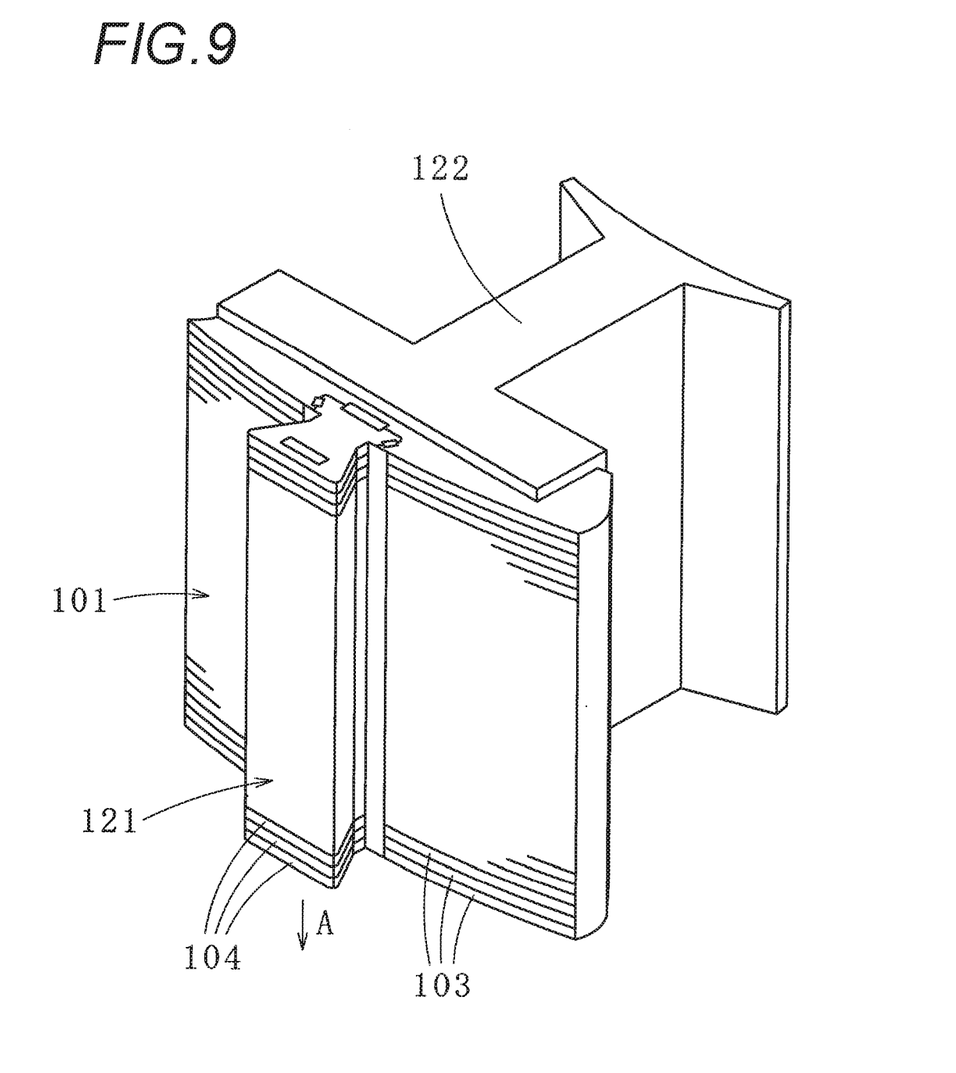
FIG. 9 is an explanatory view of a fixing jig and a unit laminated iron core formed by laminating the iron core pieces.

In such a structure, when the laminated iron core pieces 102 are caulked and connected together, as shown in FIG. 9, the caulked and connected production jig piece parts 104 form a fixing jig 121 which temporarily joins and connects together the laminated product piece parts 103 in a laminated state. When the product piece parts 103 which are temporarily joined and connected by the fixing jig 121 are integrally molded with an insulating resin 122 by a die cast molding, the temporarily joined product piece parts 103 can be actually joined and connected. Then, after the winding 101a is applied to a part where the teeth piece parts 106 are actually joined and connected together, the fixing jig 121 is slid in a direction of lamination of the iron core pieces 102, for instance, a direction A. Thus, the unit laminated iron core 101 which has no caulking part can be separated from the fixing jig 121 which has the caulking and connection part. An operation that the production jig piece parts 104 mutually adjacent in the vertical direction are bound and connected together through the caulking and connection parts 120 is referred to as a dummy caulking and the fixing jig 121 formed by the dummy caulking is referred to as a dummy caulking block.

Patent Literature 1: Japanese Patent No. 5357187

SUMMARY OF THE INVENTION

Figure 10:
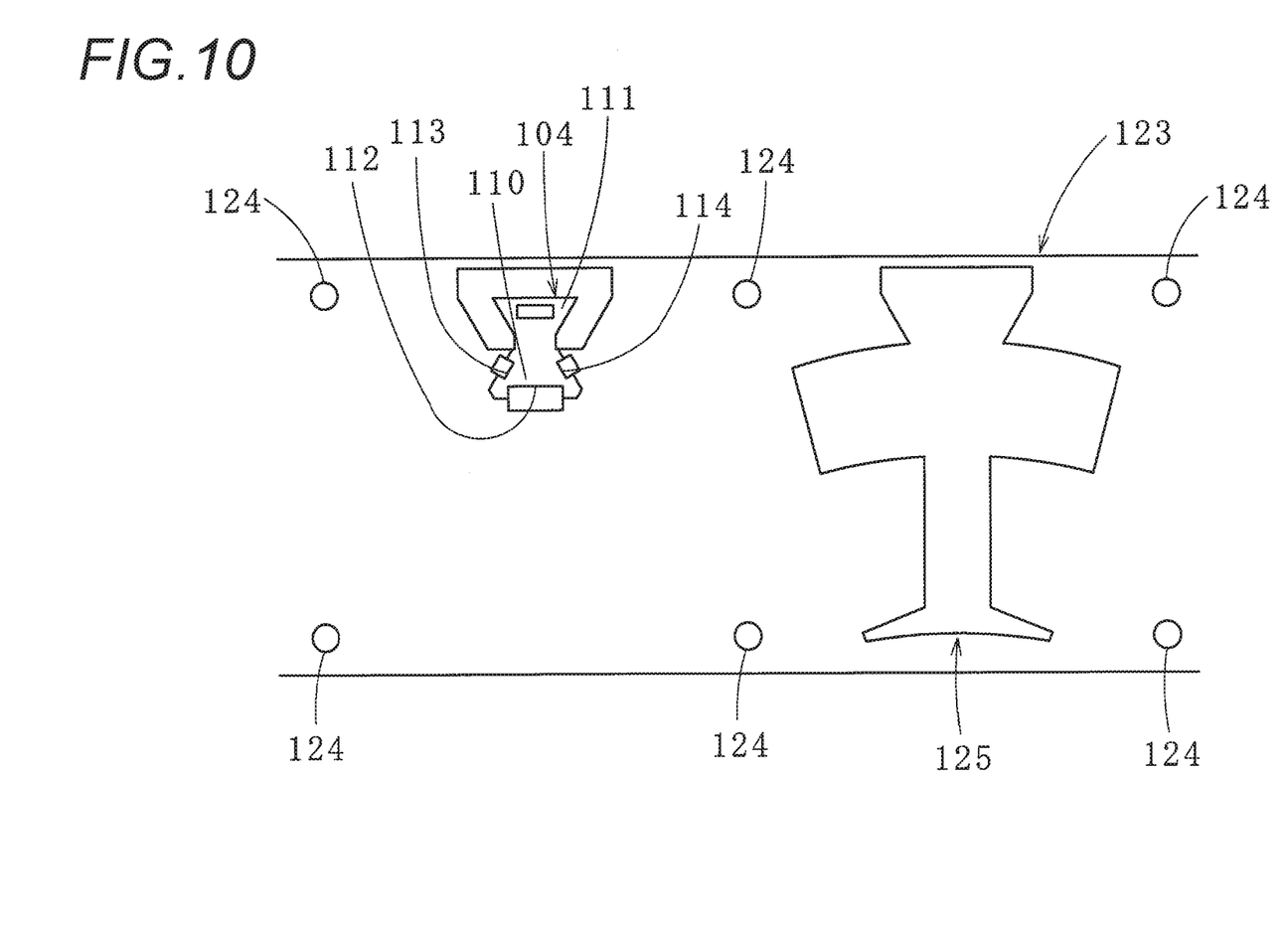
FIG. 10 is an explanatory view of a method for forming the iron core piece.

As shown in FIG. 10, a width of the fitting protrusion 110 of the production jig piece part 104 is formed so as to be gradually larger (tapered) toward the back yoke piece part 105 side from the gripping protrusion 111 side. Accordingly, a problem arises that the disengaging recessed parts 112 to 117 which reduce the contact area of the fitting part need to be worked in order to easily disengage the fixing jig 121 and a problem arises that a direction for disengaging (sliding) the fixing jig 121 is limited to the direction of lamination.

Further, when the fixing jig 121 is slid in the direction of lamination of the iron core pieces, a problem arises that the product piece parts 103 forming the unit laminated iron core 101 are turned over. FIG. 10 indicates an electromagnetic steel plate 123, a pilot hole 124 to feed progressively the electromagnetic steel plate 123, and an outer configuration blanking hole 125 formed when an outer configuration of the iron core piece 102 is blanked or stamped out.

Figure 11:
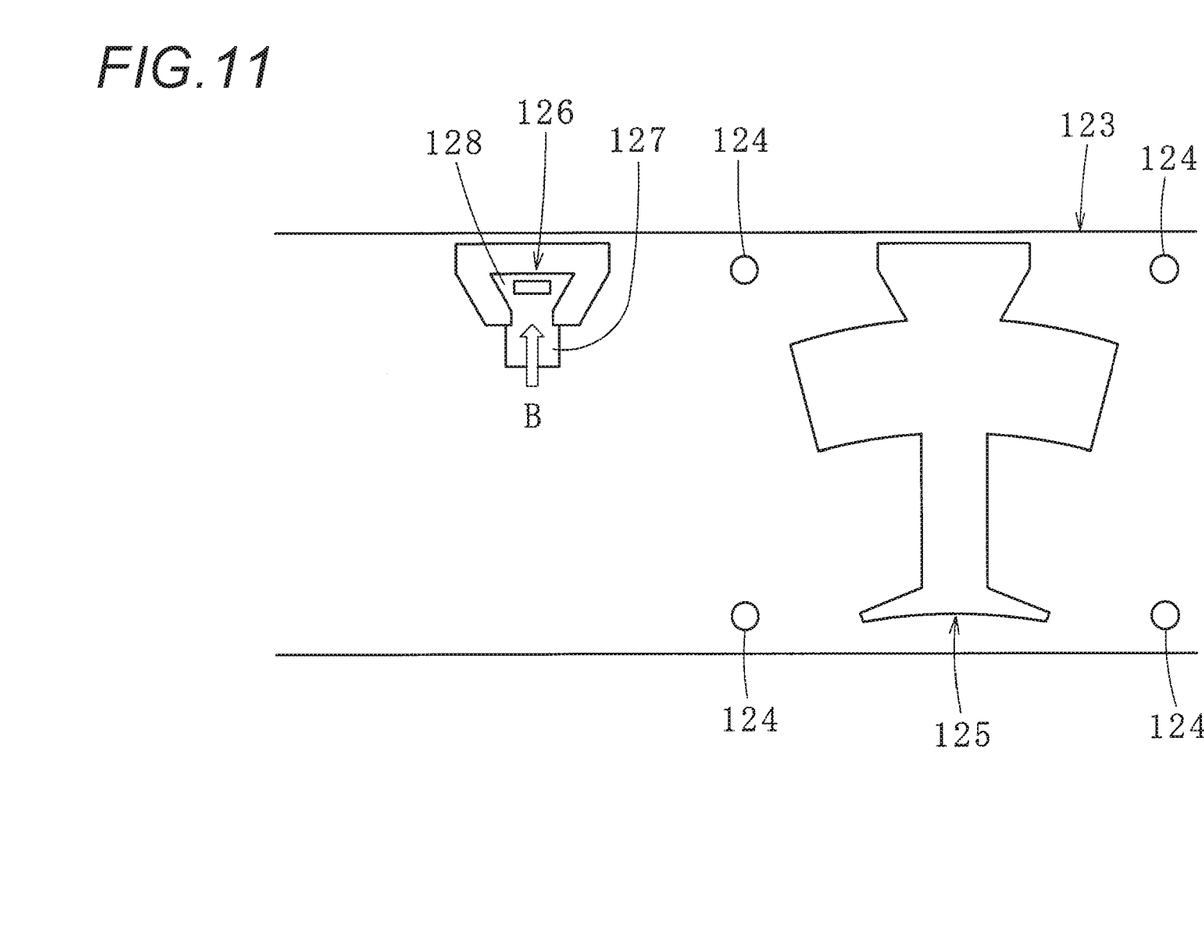
FIG. 11 is an explanatory view of another method for forming an iron core piece.

Thus, the fitting protrusion of the production jig piece part may be supposed to be formed so as to have a straight configuration or a small taper angle. Especially, as shown in FIG. 11, when a fitting protrusion 127 of a production jig piece part 126 is formed in a straight configuration, a fixing jig can be slid outward in a radial direction (a direction B) relative to a unit laminated iron core. Thus, a problem does not arise that even when the fixing jig is slid, product piece parts forming the unit laminated iron core are turned over. However, when the fitting protrusion 127 of the production jig piece part 126 is formed in the straight configuration, a problem appears that the production jig piece part 126 is shifted outward (the direction B) of a gripping protrusion 128 when a push back operation is carried out. Then, in a state where positions of the production jig piece parts 126 (accordingly, the position of the dummy caulking) are shifted, when outer configurations of iron core pieces are blanked or stamped out to laminate the iron core pieces, the fixing jig is formed in a state where the fixing jig is inclined. Accordingly, a problem arises that product piece parts are temporarily joined and connected in a state where the product piece parts are inclined, so that the unit laminated iron core is formed in a state where the unit laminated iron core is inclined.

Figure 12:
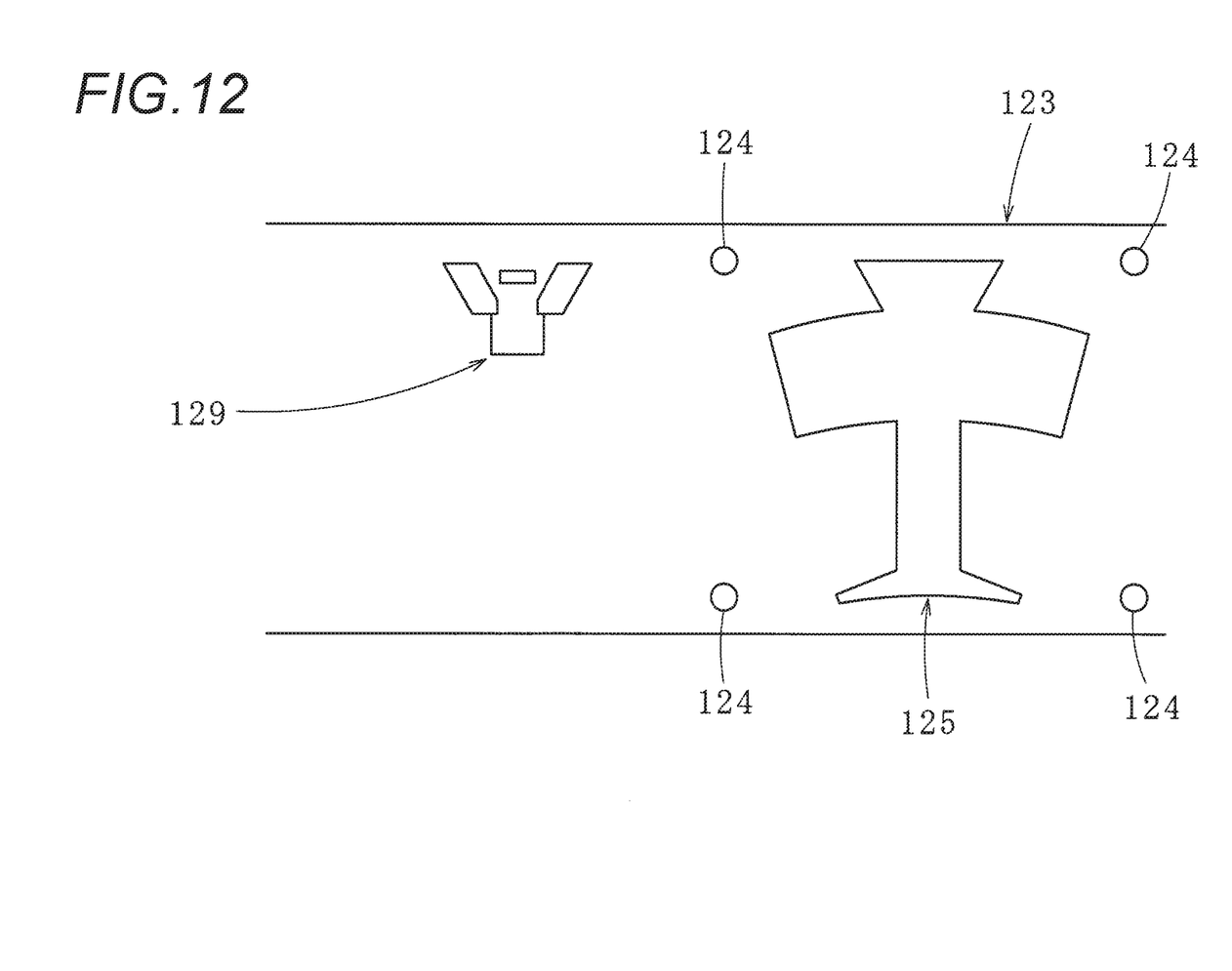
FIG. 12 is an explanatory view of a still another method for forming an iron core piece.

In order to prevent the production jig piece part from shifting outward of the gripping protrusion when the push back operation is carried out, even if the fitting protrusion of the production jig piece part is formed in the straight configuration, as shown in FIG. 12, the production jig piece part may be supposed to be formed at the same time as that the outer configuration of the iron core piece is blanked or stamped out (a formation of the outer configuration blanking hole 125). Thus, when the push back operation is carried out, since an opposite side (a side in which the gripping protrusion is formed) to an area 129 (an outline of the fitting protrusion side) where a detachment is carried out is connected to the electromagnetic steel plate 123, a problem does not arise that the production jig piece part is shifted. However, in the production of the iron core piece, the production jig piece part can be formed in an outside area of the product piece part only in a stage that the outer configuration of the iron core piece is blanked or stamped out. Accordingly, a problem appears that a position of the dummy caulking or a working sequence for blanking or stamping out the iron core piece is restricted, so that a degree of freedom of design of the laminated iron core is reduced.

The present invention is devised by considering the above-described circumstances, and it is a non-limited object of the present invention to provide a method for forming a blanked piece high in its degree of freedom of design and excellent in its accuracy of a configuration and a manufacturing method of a laminated body and a laminated iron core using the blanked piece formed by the above-described method.

A first aspect of the present invention provides a method for forming a blanked piece from a material, the blanked piece including a production area having a through hole in a central side and at least one caulking and connection area protruding inside the through hole of the production area, wherein a part of the caulking and connection area is fitted to a fitting part formed in an edge part of the through hole of the product area to temporarily connect the caulking and connection area to the product area, the method including: forming a blanking hole in the material, the blanking hole having a same outline as a configuration that combines an outline of a part of an inner periphery of the through hole from which an opening area of the fitting part is excluded with an outline of a part of the caulking and connection area protruding inside the through hole; placing a guide member in the blanking hole, the guide member having an abutting part which comes into contact with an end side of a protrusion of the material formed along the outline of the blanking hole; cutting and separating the material along an outline of the fitting part to blank or stamp out downward the caulking and connection area; pushing back the caulking and connection area in between the fitting part and the abutting part, and temporarily connecting the caulking and connection area to the material; and blanking or stamping an outer configuration of the product area from the material to which the caulking and connection area is temporarily connected.

A second aspect of the present invention provides a manufacturing method of a laminated body which is formed by laminating the blanked pieces formed by the method as defined in the first aspect of the present invention, including temporarily fixing the laminated product areas by the caulking and connection areas which are caulked and connected through caulking and connection parts.

A third aspect of the present invention provides a manufacturing method of a laminated iron core which is formed by laminating the blanked pieces formed by the method as defined in the first aspect of the present invention, including: where the material is an electromagnetic steel plate and the product area is an iron core piece which configures a part of the laminated iron core, temporarily fixing the laminated product areas by the caulking and connection areas which are caulked and connected through the caulking and connection parts; and integrating the temporarily fixed product areas to form the laminated iron core, and then, moving the caulking and connection areas which are caulked and connected together in a direction intersecting at right angles to a direction of lamination to detach the caulking and connection areas from the integrated product areas.

In the method for forming the blanked piece according to the first aspect of the present invention, a blanking hole is provided in the material. A guide member having an abutting part which comes into contact with an end side of a protrusion of the material formed along the outline of the blanking hole is placed in the blanking hole to carry out a cut and separation of the material along an outline of the fitting part to blank and form the caulking and connection area from the material. After that, since the caulking and connection area is pushed back in between the fitting part formed in the material and the abutting part, the caulking and connection area can be temporarily and accurately connected to the material. Thus, a restriction is eliminated that other blanking or stamping works respectively necessary for a product area and the caulking and connection area need to be sequentially carried out in accordance with the formation of the product area and the caulking and connection area respectively, and a degree of freedom of design of a blanking or stamping die can be improved. Further, since an outer configuration of the product area is blanked or stamped out from the material to which the caulking and connection area is temporarily and accurately connected, a blanked piece excellent in its accuracy of a configuration can be stably formed.

In the manufacturing method of the laminated body according to the second aspect of the present invention, since the blanked pieces excellent in their accuracy of configuration are laminated, a caulking laminated part having the caulking and connection areas laminated can be accurately formed and the laminated product areas can be accurately and temporarily fixed.

In the manufacturing method of the laminated iron core according to the third aspect of the present invention, after the laminated product areas which are temporarily fixed through the caulking and connection areas which are caulked and connected are integrally formed, the caulking and connection areas which are caulked and connected together are detached. Accordingly, the caulking and connection parts are not provided in the laminated iron core formed with the laminated product areas, so that the laminated iron core small in its iron loss can be obtained.

DETAILED DESCRIPTION OF THE EXEMPLARY EMBODIMENTS

Figure 1:
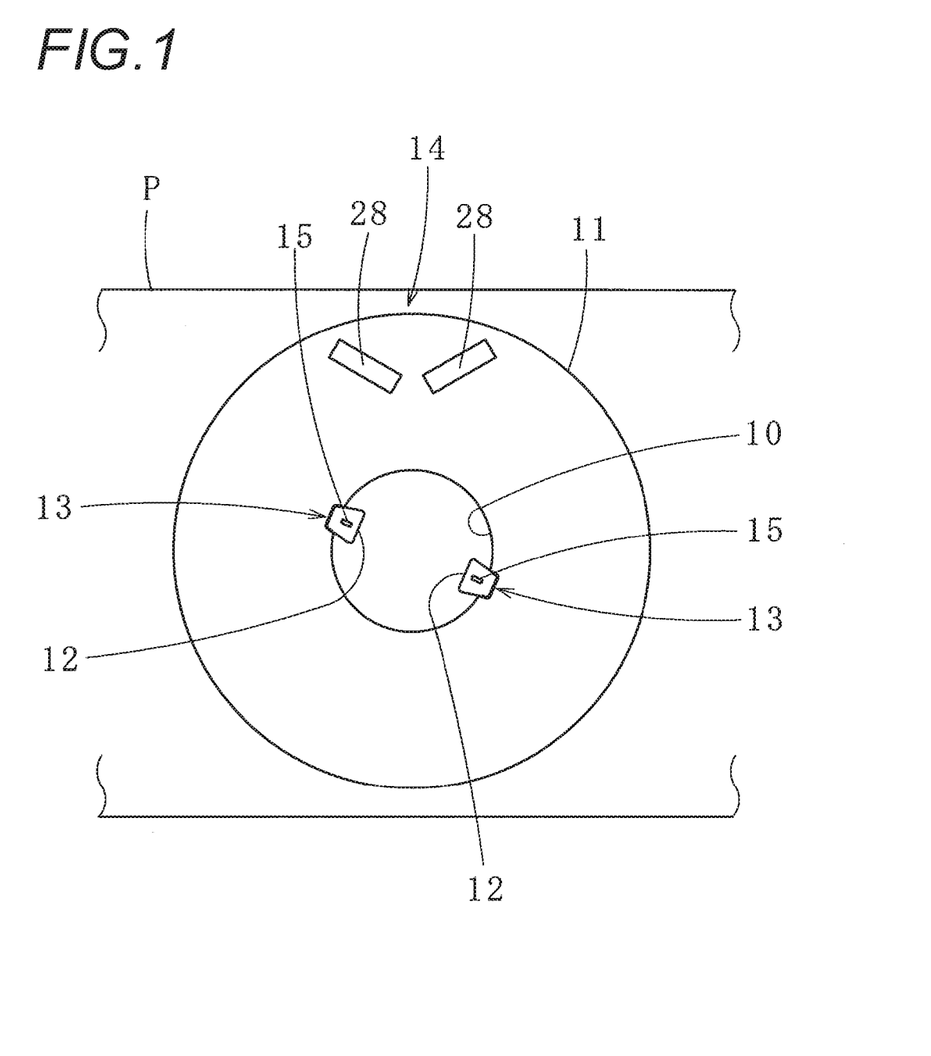
FIG. 1 is an explanatory view of a blanked piece formed by a method for forming a blanked piece according to a first exemplary embodiment of the present invention.

Subsequently, referring to the accompanying drawings, exemplary embodiments which embody the present invention will be described below to understand the present invention. A method for forming a blanked piece according to a first exemplary embodiment is a method for forming a blanked piece 14 from an electromagnetic steel plate P. The electromagnetic steel plate P is one example of a material to be blanked or stamped, and may be simply referred to as a material. As shown in FIG. 1, the blanked piece 14 has, for instance, a planar configuration same as a planar configuration of an iron core piece (not shown in the drawing) which configures a rotor. The blanked piece 14 includes a product area 11 provided with a shaft hole 10, which is one example of a through hole, in a central side and two caulking and connection areas 12 protruding so as to be opposed to each other inside the shaft hole 10. In the blanked piece 14, the product area 11 is temporarily connected to the caulking and connection areas 12 in such a way that the caulking and connection areas 12 are allowed to be partly temporarily fitted to fitting parts 13 formed in edge parts of the though hole of the product area 11. A detail thereof will be described below.

Figure 2:
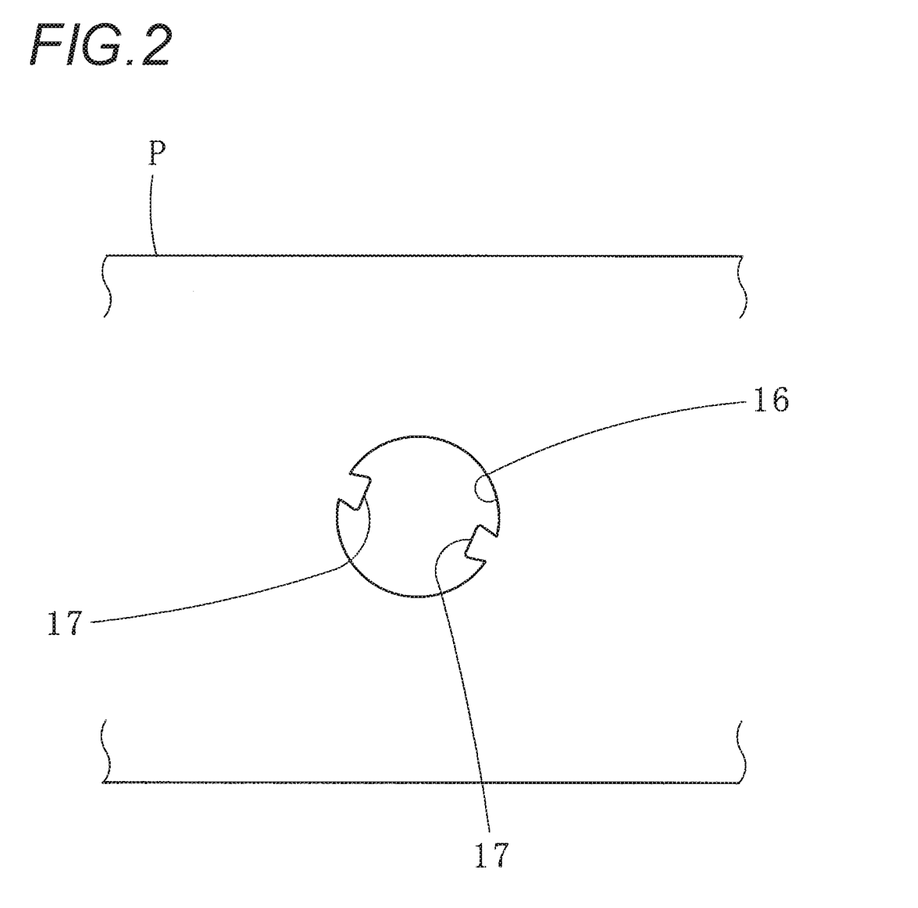
FIG. 2 is an explanatory view showing that a blanking hole is blanked or stamped out from an electromagnetic steel plate P.

The method for forming the blanked piece according to the present exemplary embodiment has, as shown in FIG. 2, a process that a blanking hole 16 is formed in the electromagnetic steel plate P which has the same outline as a configuration that has combines outlines of parts of an inner periphery of the shaft hole 10 excluding opening areas of the fitting parts 13 with outlines of parts of the caulking and connection areas 12 protruding inside the shaft hole 10.

Figure 3A:
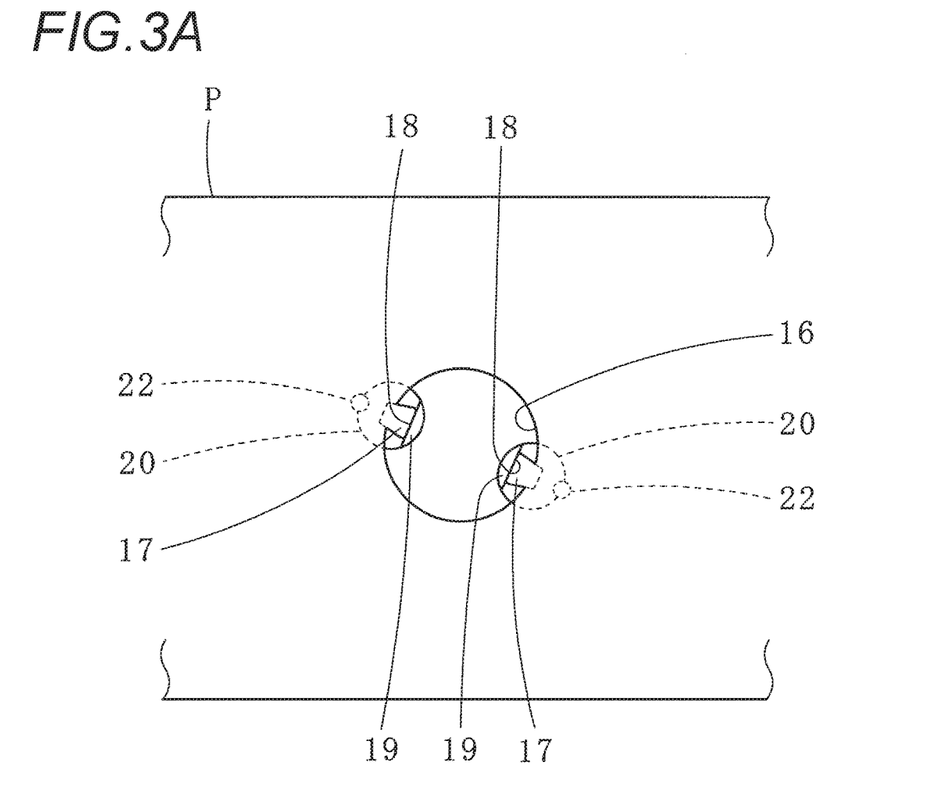
FIG. 3A is a plan view showing an arrangement of a guide member and a die when a caulking and connection area is blanked or stamped.
Figure 3B:
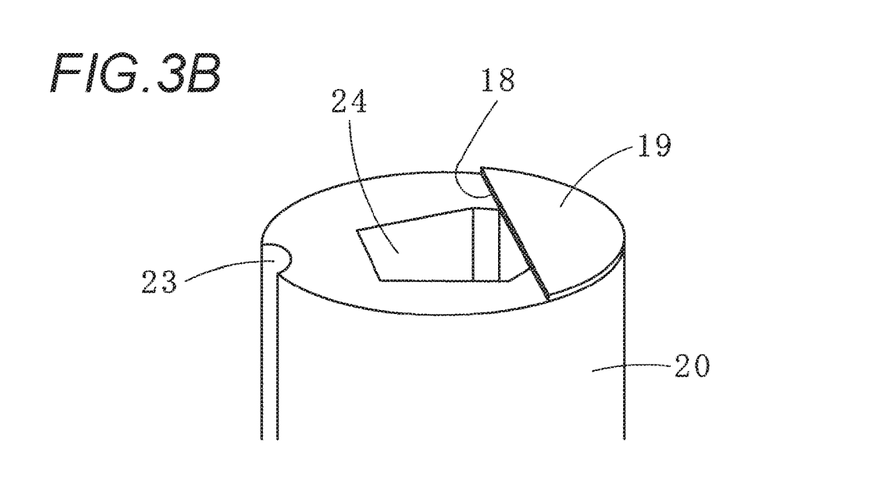
FIG. 3B is a perspective view of the die having the guide member provided in an upper surface side.
Figure 4A:
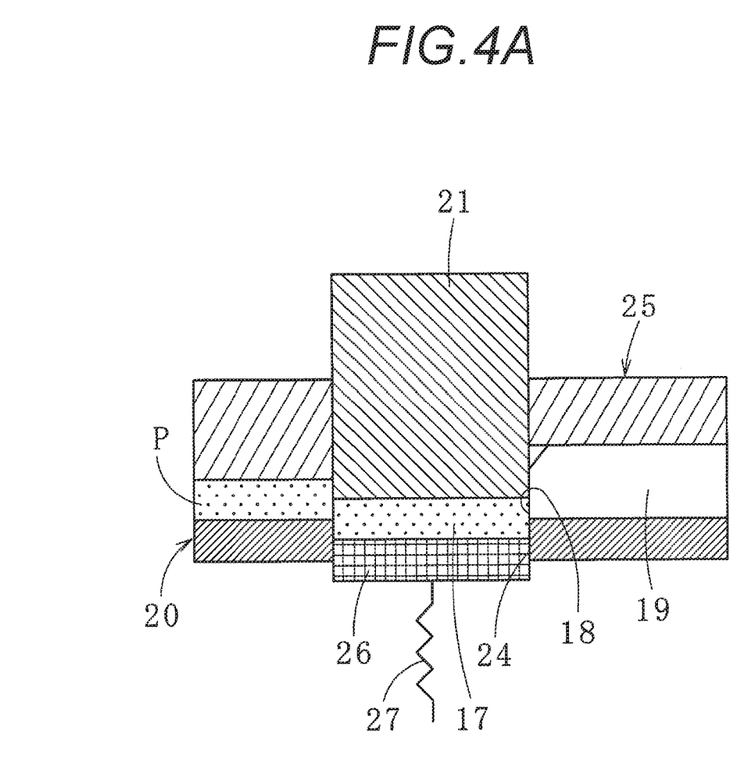
FIG. 4A is an explanatory view showing that a cut and separation along an outline of a fitting part is carried out in the electromagnetic steel plate P.
Figure 4B:
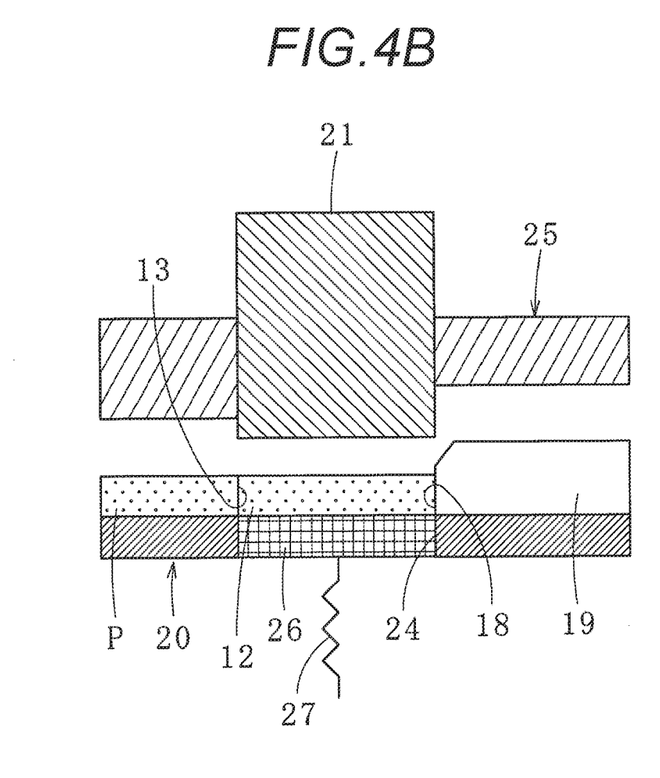
FIG. 4B is an explanatory view showing a state that the caulking and connection area which is blanked or stamped is temporarily connected to the electromagnetic steel plate P.

Further, the method for forming the blanked piece includes a process of placing a guide member 19 on an upper surface side of a die 20 used for blanking or stamping the caulking and connection area 12, the guide member 19 having an abutting part 18 which comes into an end side of a protrusion 17 formed in the blanking hole 16, as shown in FIGS. 3A and 3B. When the caulking and connection area 12 is blanked or stamped out, the guide member 19 is initially allowed to enter the blanking hole 16, and then, a blanking punch 21 is lowered to carry out a cut and separation of the caulking and connection area 12 along the outline of the fitting part 13 as shown in FIGS. 4A and 4B and blank or stamp downward the caulking and connection area 12 from the electromagnetic steel plate P. Then, the caulking and connection area 12 is pushed back in between the fitting part 13 formed in the electromagnetic steel plate P after the caulking and connection area 12 is blanked or stamped and the abutting part 18 so that the caulking and connection area 12 is temporarily connected to the electromagnetic steel plate P from which the caulking and connection area 12 is blanked or stamped. The method further includes a process that an outer configuration of the product area 11 is blanked or stamped from the electromagnetic steel plate P to which the caulking and connection areas 12 are temporarily connected.

A fixing pin 22 is provided for fixing the die 20 to a die plate not shown in the drawing. An insert groove 23 formed in the die 20 configures a part of an insert hole of the fixing pin 22. An accommodation part 24 accommodates the caulking and connection area 12 blanked or stamped downward. A stripper plate 25 is lifted and lowered together with the blanking punch 21.

A knock out punch 26 abuts on a lower surface of a part where the caulking and connection area 12 is formed including the protrusion 17 in the end side to support the caulking and connection area 12 which is lowered synchronously with a part pushed and lowered by the blanking punch 21 and cut and separated from the electromagnetic steel plate P, and is lifted when the blanking punch 21 is lifted to push back the caulking and connection area 12 to the part between the fitting part 13 and the abutting part 18. A spring member 27 lifts or lowers the knock out punch 26 in accordance with a lifting and lowering movement of the blanking punch 21.

As shown in FIG. 4A, when the caulking and connection area 12 is blanked or stamped out from the protrusion 17 in the blanking hole 16, since the guide member 19 is provided in the end side of the protrusion 17 through the abutting part 18, the protrusion 17 is blanked or stamped in a state where the protrusion 17 is restrained by the electromagnetic steel plate P side and the guide member 19. Then, since the formed caulking and connection area 12 enters the accommodation part 24 of the die 20 in a state where the caulking and connection area 12 is mounted on the knock out punch 26, a horizontal movement of the caulking and connection area 12 is restrained by the accommodation part 24.

Then, when the blanking punch 21 is lifted, the knock out punch 26 is also lifted. Thus, the caulking and connection area 12 mounted on the knock out punch 26 is discharged from the accommodation part 24 of the die 20 and enters a space part surrounded by the fitting part 13 formed in the electromagnetic steel plate P after the caulking and connection area 12 is blanked or stamped and the abutting part 18 provided in the upper surface side of the die 20. Then, as the blanking punch 21 is more lifted, the caulking and connection area 12 is lifted in the space part in a state where the caulking and connection area 12 is held (restrained) from both the sides of the fitting part 13 and the guide member 19 (the abutting part 18). Thus, a central position of the caulking and connection area 12 in its lifting movement correspond to a central position of the caulking and connection area 12 which is formed when the caulking and connection area 12 is blanked or stamped from the electromagnetic steel plate P. As a result, a part of the caulking and connection area 12 can be precisely pushed back into the fitting part 13 formed in the electromagnetic steel plate P and temporarily connected to the electromagnetic steel plate P. Then, since the outer configuration of the product area 11 is blanked or stamped from the electromagnetic steel plate P to which the caulking and connection areas 12 are accurately and temporarily connected, the blanked piece 14 excellent in its accuracy of a configuration can be stably formed.

Figure 5A:
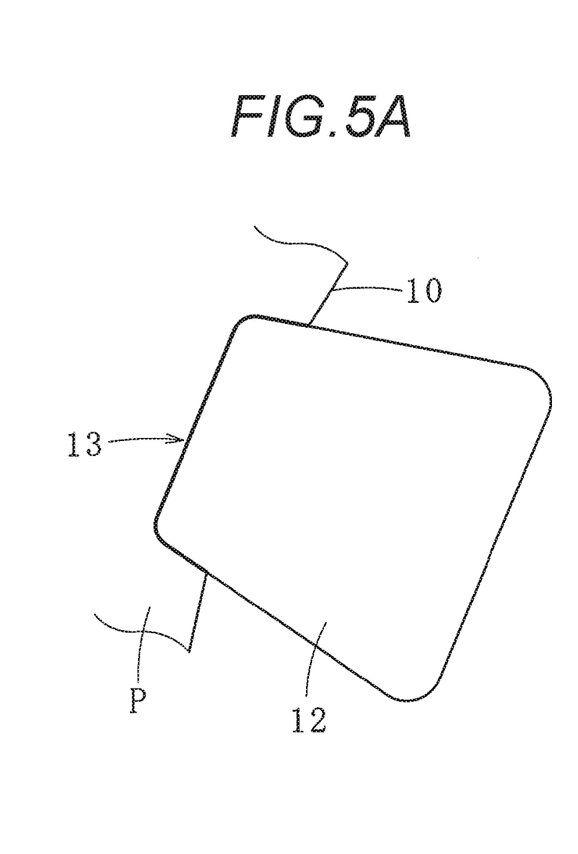
FIG. 5A and FIG. 5B are explanatory views of a fitting part.
Figure 5B:
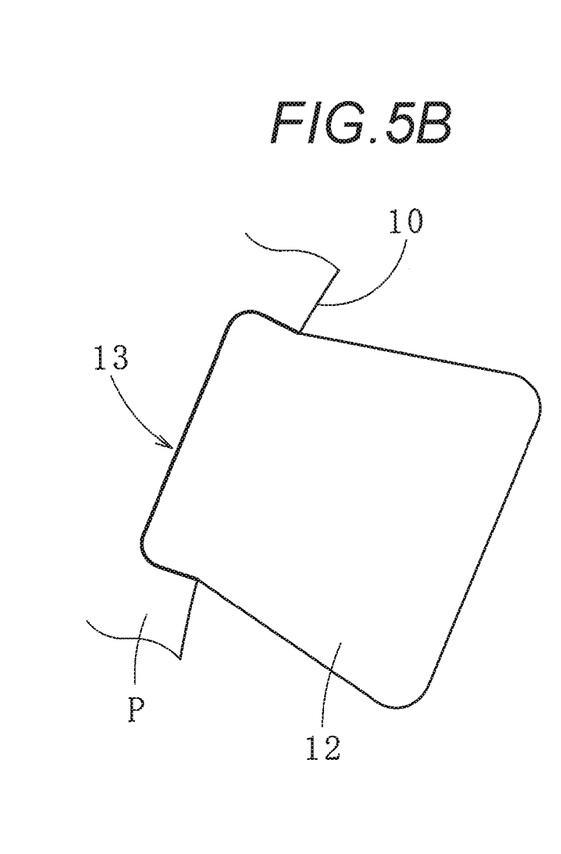

Since the guide member 19 is provided, a horizontal shift of the caulking and connection area 12 can be prevented and precisely pushed back into the fitting part 13. Accordingly, for instance, a width of the fitting part is usually formed to be smaller toward an opening side of the fitting part so that a part of the caulking and connection area may be engaged with the fitting part and the caulking and connection area may be prevented from being pushed outside the fitting part by a frictional force generated when a part of the caulking and connection area is pushed back to the fitting part. However, in the present exemplary embodiment, a configuration of the fitting part 13 can be freely determined. For instance, as shown in FIG. 5A, a width of the fitting part 13 may be allowed to be gradually larger toward an opening side of the fitting part 13. Alternatively, as shown in FIG. 5B, the fitting part 13 may be formed so as to have a constant width.

Further, since a part of the caulking and connection area 12 can be precisely pushed back into the fitting part 13 formed in the electromagnetic steel plate P and temporarily connected to the electromagnetic steel plate P, a configuration of the caulking and connection area 12 temporarily connected to the electromagnetic steel plate P in plan view corresponds to a configuration of the protrusion 17 formed in the blanking hole 16 of the electromagnetic steel plate P in plan view. Accordingly, other blanking or stamping works respectively applied to the product area 11 and the caulking and connection area 12, for instance, a work of a caulking and connection part 15 provided in the caulking and connection area 12 and a work of a magnet insert hole 28 provided in the product area 11 can be respectively carried out in any of (1) a stage before the process that the blanking hole 16 is formed, (2) a stage between the process that the blanking hole 16 is formed and the process that the caulking and connection area 12 is temporarily connected to the electromagnetic steel plate P and a stage (3) between the process that the caulking and connection area 12 is temporarily connected to the electromagnetic steel plate P and the process that the outer configuration of the product area 11 is blanked or stamped. As a result, a blanking or stamping work can be further applied respectively to the caulking and connection area 12 and the material. Thus, a degree of freedom of design of a blanking die can be improved.

Figure 6A:
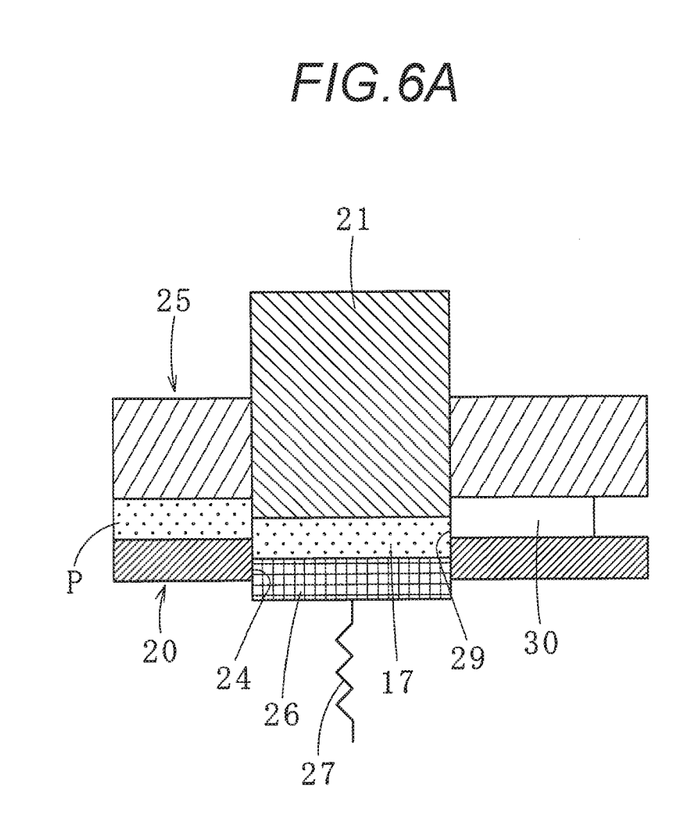
FIG. 6A is an explanatory view showing that a cut and separation along an outline of a fitting part is carried out in an electromagnetic steel plate in a method for forming a blanked piece according to a modified example.
Figure 6B:
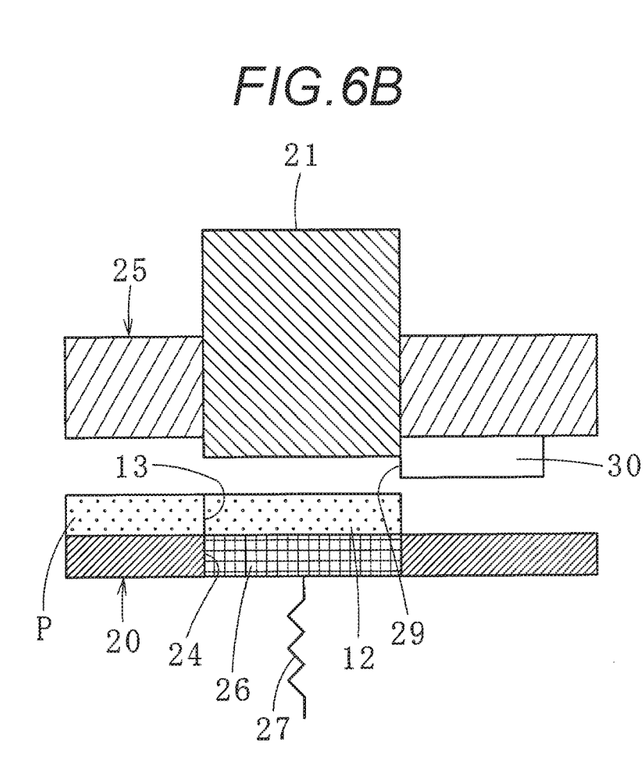
FIG. 6B is an explanatory view showing a state that a caulking and connection area which is blanked or stamped is temporarily connected to the electromagnetic steel plate.

In the method for forming the blanked piece according to the first exemplary embodiment, the guide member 19 is provided in the upper surface side of the die 20. However, as shown in FIGS. 6A and 6B, a guide member 30 having an abutting part 29 which comes into contact with the end side of the protrusion 17 may be provided in a lower surface side of the stripper plate 25 used for blanking or stamping the caulking and connection area 12. As shown in FIG. 6A, when the caulking and connection area 12 is blanked or stamped from the protrusion 17 in the blanking hole 16, the stripper plate 25 is lowered as the blanking punch 21 is lowered. Then, the guide member 30 provided in the lower surface side of the stripper plate 25 enters the blanking hole 16. The guide member 30 is present in the end side of the protrusion 17 through the abutting part 29. A part where the caulking and connection area 12 is formed which includes the protrusion 17 in the end side is blanked or stamped in a state where the part is restrained by the electromagnetic steel plate P side and the guide member 30. Then, since the formed caulking and connection area 12 enters the accommodation part 24 of the die 20 in a state where the caulking and connection area 12 is mounted on the knock out punch 26.

Then, when the blanking punch 21 is lifted, the knock out punch 26 is also lifted. The caulking and connection area 12 mounted on the knock out punch 26 enters from the accommodation part 24 of the die 20 a space part surrounded by the fitting part 13 formed in the electromagnetic steel plate P and the guide member 30 (the abutting part 29) provided in the lower surface side of the stripper plate 25. Then, as the blanking punch 21 is more lifted, the caulking and connection area 12 is lifted in the space part in a state where the caulking and connection area 12 is held (restrained) from both the sides of the fitting part 13 and the guide member 30. When the stripper plate 25 is detached from the electromagnetic steel plate P, i.e., when the stripper plate 25 is detached from the caulking and connection area 12, a part of the caulking and connection area 12 is pushed back into the fitting part 13 formed in the electromagnetic steel plate P and the caulking and connection area 12 is temporarily connected to the electromagnetic steel plate P. An operational effect of the guide member 30 provided in the lower surface side of the stripper plate 25 is the same as an operational effect of the guide member 19 provided in the upper surface side of the die 20, an explanation thereof is omitted.

A manufacturing method of a laminated body according to a second exemplary embodiment of the present invention is a manufacturing method of a laminated body by laminating the blanked pieces 14 formed by the method for forming the blanked piece according to the first exemplary embodiment. Here, in the method for forming the blanked piece according to the first exemplary embodiment, since the caulking and connection area 12 is precisely pushed back to the fitting part 13 formed in the electromagnetic steel plate P, the blanked pieces 14 formed by blanking or stamping out the outer configuration of the product area 11 from the electromagnetic steel plate P to which the caulking and connection area 12 is temporarily connected always have the same configurations. Accordingly, when the blanked pieces 14 are laminated, the two caulking and connection areas 12 and the product areas 11 are respectively precisely superposed one upon another in the vertical direction to form the laminated body. Here, the caulking and connection areas 12 are respectively caulked and joined through the caulking and connection parts 15 to form caulking and connection blocks. Then, since the caulking and connection blocks are respectively arranged in the through hole formed by laminating the shaft holes 10 provided in central sides of the blanked pieces 14, parts in which the product areas 11 are laminated to which the caulking and connection areas 12 are temporarily connected are temporarily fixed by the two caulking and connection blocks.

A manufacturing method of a laminated iron core according to a third exemplary embodiment of the present invention is a manufacturing method of a laminated iron core which configures a part of a rotor by laminating the blanked pieces 14 formed by the method for forming the blanked piece according to the first exemplary embodiment. Here, the manufacturing method of the laminated iron core includes a process that the blanked pieces 14 are laminated, and in the through hole formed by laminating the shaft holes 10 provided in the central sides of the blanked pieces 14, the caulking and connection blocks are formed by which the two caulking and connection area 12 protruding in the shaft holes 10 of the blanked pieces 14 and respectively superposed one upon another in the vertical direction are caulked and joined through the caulking and connection parts 15 so that parts where the production areas 11 temporarily connected to the caulking and connection areas 12 through the fitting parts 13 (namely, the iron core pieces) are laminated are temporarily fixed by the two caulking and connection blocks, a process that a product area laminated part which is temporarily fixed (an iron core piece laminated part which is temporarily fixed) is integrated to form the laminated iron core, and a process that the caulking and connection blocks are moved and detached from the laminated iron core in a direction intersecting at right angles to a direction of lamination.

In the blanked piece 14 formed in such a way that the caulking and connection areas 12 are temporarily connected to the iron core piece, the caulking and connection areas 12 formed by carrying out a cut and separation along the outlines of the fitting parts 13 are precisely pushed back into the fitting parts 13. Accordingly, when the blanked pieces 14 are laminated, the caulking and connection areas 12 and the iron core pieces are respectively precisely superposed one upon another in the vertical direction. Thus, axial directions of the caulking and connection blocks are respectively parallel to a direction of lamination of the blanked pieces 14. The iron core piece laminated part which is temporarily fixed by the two caulking and connection blocks is also parallel to the direction of lamination of the blanked pieces 14. As a result, an axial direction of the laminated iron core obtained by integrally forming the temporarily fixed iron core piece laminated part is parallel to the direction of lamination. Here, in order to integrate the temporarily fixed iron core piece laminated part, the temporarily fixed iron core piece laminated part is integrally molded with an insulating resin by, for instance, a die cast molding. Thus, when a permanent magnet is inserted into a magnet insert part (formed by laminating the magnet insert holes 28) formed in the temporarily fixed iron core piece laminated part and sealed by a resin, or when a resin is injected to a resin injection part formed by laminating resin injection holes which are previously formed in the iron core pieces, the iron core piece laminated part can be integrated.

Since the fitting part 13 which temporarily connects the caulking and connection area 12 to the iron core piece has, for instance, as shown in FIG. 5A, a configuration that a width of the fitting par 13 is gradually increased toward the opening side of the fitting part 13, or as shown in FIG. 5B, a configuration that the width of the fitting part 13 is constant, the caulking and connection blocks can be moved from the laminated iron core in the direction intersecting at right angles to the direction of lamination. Thus, when the caulking and connection blocks are detached from the laminated iron core, such a problem as to turn over the iron core pieces forming the laminated iron core does not arise. Further, since the caulking and connection parts do not exist in the laminated iron core, the laminated iron core high in its torque and low in its iron loss can be obtained.

The present invention is described as stated above by referring to the exemplary embodiments. However, the present invention is not limited to the structures described in the above-described exemplary embodiments, and may include other exemplary embodiments or modified examples considered within a range of matters described in claims. Further, combinations of the component elements respectively included in the exemplary embodiments of the present invention, other exemplary embodiment or the modified examples may be also included in the present invention. For instance, the two caulking and connection areas are arranged which protrude so as to be opposed in an inner side of the through hole of the product area. However, one or three or more caulking and connection areas may be alternatively provided depending on the configuration or the size of the product area. Further, in FIGS. 6A and 6B, the guide member is provided in the lower surface side of the stripper plate. However, the guide member may be directly provided in the blanking punch. Further, in the present exemplary embodiments, as an example of the through hole of the product area, the shaft hole is described. However, the caulking and connection area may be arranged so as to protrude inside the magnet insert hole or a lightweight hole.

What is claimed is:

1. A method for forming a blanked piece from a material, the blanked piece including a product area having a through hole in a central side and at least one caulking and connection area protruding inside the through hole of the product area, wherein a part of the caulking and connection area is fitted to a fitting part of the product area formed in an edge part of the through hole of the product area to temporarily connect the caulking and connection area to the product area, the method comprising:

forming a blanking hole in the material, the blanking hole having a same outline as a configuration that combines an outline of a part of an inner periphery of the through hole from which an opening area of the fitting part is excluded with an outline of a part of the caulking and connection area protruding inside the through hole;

placing a guide member in the blanking hole, the guide member having an abutting part which comes into contact with a tip end of a protrusion of the material formed along the outline of the blanking hole;

cutting and separating the material along an outline of the fitting part by blanking or stamping out downward the caulking and connection area into an accommodation part that receives the caulking and connection area during the blanking or stamping out operation;

providing a knockout punch abutting on a lower surface of the caulking and connection area;

pushing back the caulking and connection area by lifting the knockout punch after the downward motion of the blanking or stamping out operation is finished, to position the caulking and connection area in between the fitting part and the abutting part of the guide member, and temporarily connecting the caulking and connection area to the material of the product area; and blanking or stamping an outer configuration of the product area from the material to which the caulking and connection area is temporarily connected.

2. The method according to claim 1, wherein the abutting part of the guide member is provided in an upper surface side of a die used for blanking or stamping the caulking and connection area.

3. The method according to claim 1, wherein the abutting part of the guide member is provided in a lower surface side of a stripper plate lifted and lowered together with a punch used for blanking or stamping the caulking and connection area.

4. The method according to claim 1, wherein the fitting part of the product area has a width gradually larger toward an opening side from a bottom of the fitting part or a constant width.

5. A manufacturing method of a laminated body which is formed by laminating the blanked pieces formed by the method as defined in claim 1, comprising temporarily fixing the laminated product areas by the caulking and connection areas which are caulked and connected through caulking and connection parts.

6. A manufacturing method of a laminated iron core which is formed by laminating the blanked pieces formed by the method as defined in claim 4, comprising:

where the material is an electromagnetic steel plate and the product area is an iron core piece which configures a part of the laminated iron core, temporarily fixing the laminated product areas by the caulking and connection areas which are caulked and connected through the caulking and connection parts; and integrating the temporarily fixed product areas to form the laminated iron core, and then, moving the caulking and connection areas which are caulked and connected together in a direction intersecting at right angles to a direction of lamination to detach the caulking and connection areas from the integrated product areas.

7. The method according to claim 1, wherein the abutting part of the guide member comes into contact with the tip end of the protrusion during formation of the blanked piece and prior to lamination of a plurality of the blanked pieces.

* * * * *